United States Patent Office 3,113,970
Patented Dec. 10, 1963

3,113,970
PROCESS FOR PREPARING BENZOPHENONE
COMPOUNDS
Harry L. Slates, Florham Park, and Norman L. Wendler,
Summit, N.J., assignors to Merck & Co., Inc., Rahway,
N.J., a corporation of New Jersey
No Drawing. Filed Nov. 22, 1960, Ser. No. 70,912
2 Claims. (Cl. 260—591)

This invention relates generally to the preparation of chemical compounds. More particularly, it relates to a new and novel synthesis of griseofulvin and related compounds. It relates further to novel substances which are intermediates in producing said related compounds. Still more specifically, it is concerned with the synthesis of griseofulvin and analogs thereof from derivatives of 2,4'-dihydroxy-4,6,2'-trimethoxy benzophenone, and with intermediates obtained in such synthesis.

Griseofulvin is a well-known antifungal agent having the structural formula

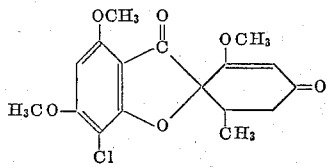

It is an antifungal agent effective when administered orally in the treatment of various systemic fungus infections. Heretofore, griseofulvin has been produced microbiologically by certain strains of Penicillia. Meanwhile, efforts have continued to synthesize the complex griseofulvin molecule chemically since a feasible chemical synthesis would permit the study of improved methods of making griseofulvin and would further permit the preparation of griseofulvin analogs and derivatives that are not accessible by fermentation.

It has now been found that griseofulvin and analogs thereof may be synthesized chemically by a relatively short and feasible process employing as the starting materials an appropriately substituted phenol and an appropriately substituted benzoyl halide. This process may be pictured structurally as follows:

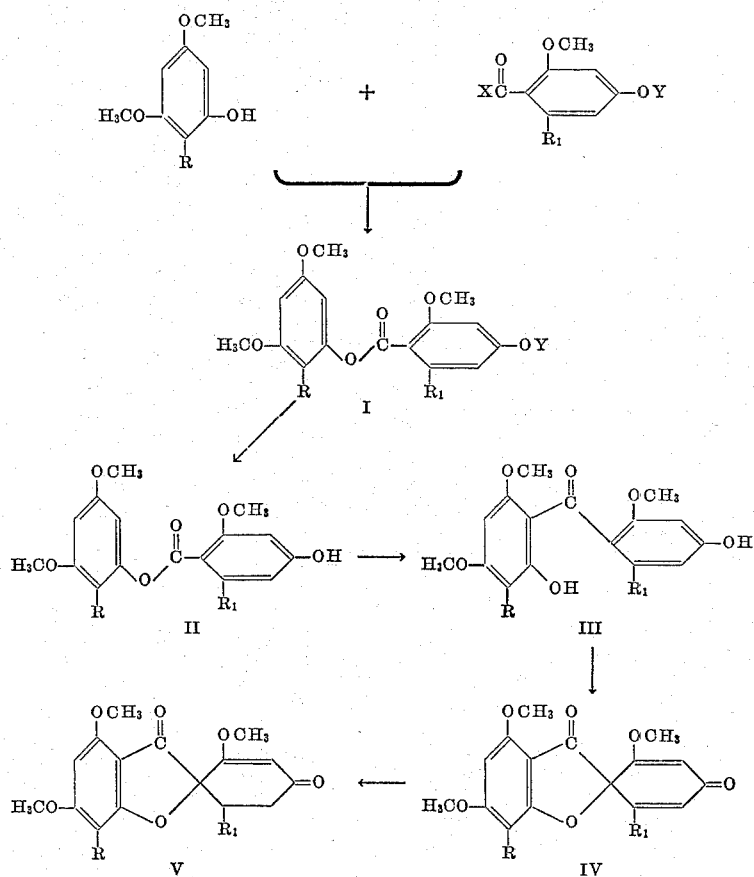

In the above formulas, R may be hydrogen or halogen, $R_1$ may be hydrogen or a lower alkyl group, X is chlorine or bromine, and Y is a lower alkanoyl radical.

As set forth in the flow diagram, it has been found that 2,4'-dihydroxy-3-R-4,6,2'-trimethoxy - 6' - $R_1$-benzophenone (Compound III above), an important intermediate in the overall synthesis, may be obtained by reacting together 2-$R_1$-4-acetoxy-6-methoxy benzoyl chloride and 2-R-3,5-dimethoxyphenol to produce 2-R-3,5-dimethoxy-2-$R_1$-4 - acetoxy - 6 - methoxybenzoate (Compound I), treating this latter compound with a base under mild conditions to form 2-R-3,5-dimethoxy-2-$R_1$-4-hydroxy-6-methoxybenzoate (Compound II), and then exposing this last-mentioned substance to ultra-violet light whereby the benzophenone III is produced. In the above compounds R and $R_1$ have the meanings set forth previously.

The 2,4'-dihydroxy-3-R-4,6,2'-trimethoxy-6'-$R_1$-benzophenone (III) formed as described above is converted on treatment with potassium ferricyanide in aqueous potassium carbonate to racemic 7-R-4,6,2'-trimethoxy-6'-$R_1$-gris-2',5'-diene-3,4'-dione (Compound IV), where R and $R_1$ are as defined above. The nomenclature used for describing Compounds IV and V is that recommended by Grove et al., J. Chem. Soc. 3977 (1952). There may be obtained in this fashion racemic forms of 7-chloro-4,6,2'-trimethoxy-6'-methyl-gris-2',5'-diene-3,4'-dione (dehydrogriseofulvin); 7-fluoro-4,6,2'-trimethoxy-6'-methyl-gris-2',5'-diene-3,4'-dione; 4,6,2'-trimethoxy - 6' - methyl-gris-2',5'-diene-3,4'-dione; 7 - chloro - 4,6,2' - trimethoxy-gris-2',5'-diene-3,4'-dione; 7-chloro-4,6,2'-trimethoxy - 6'-ethyl-gris-2',5'-diene-3,4'-dione; 7-chloro-4,6,2' - trimethoxy-6'-propyl-gris-2',5'-diene-3,4'-dione and similar compounds wherein the 7-position may be substituted with hydrogen or halogen, and the 6'-substituent may be hydrogen or a lower alkyl group.

One of the difficulties encountered in the attempts at a total chemical synthesis of griseofulvin and analogs thereof has been the reduction of one of the double bonds in the diene IV. Successful reduction of the proper double bond would afford racemic griseofulvin (Compound V, R=Cl, $R_1$=$CH_3$) and racemic analogs of griseofulvin. The one reported method of effecting this reduction suffers the disadvantage of requiring an unusual and expensive catalyst. It is one object of the present invention to provide a convenient and practical method of bringing about this reduction. A more specific object is provision of a method which gives high yields of the desired compound without the necessity of using expensive and unusual reducing agents. Other objects will be apparent from the following description of our invention.

We have now discovered, according to the present invention, that 7-R-4,6,2'-trimethoxy-6'-$R_1$-gris-2,5'-diene-3,4'-dione may be reduced in substantial yield to the desired 7-R-4,6,2'-trimethoxy-6'-R-gris-2' - ene - 3,4' - dione (Compound V) by treatment with hydrogen in the presence of a palladium catalyst.

We accomplish our catalytic reduction by bringing together a solution of the diene IV in a suitable organic solvent, such as ethyl acetate, and a palladium catalyst, and exposing this reaction mixture to hydrogen. The hydrogenation is conveniently carried out at about room temperature and substantially at atmospheric pressure. It will be appreciated that the reaction may be conducted at higher temperatures or under a slight positive pressure, but these conditions are unnecessary for good yield. As catalyst it is preferred to employ palladium on charcoal, although other catalyst carriers could be utilized if desired. With respect to the quantity of catalyst, we prefer to use an amount of palladium equal to about 5–25% by weight of the diene IV, although good results are obtained with smaller or larger quantities.

The hydrogenation is allowed to continue until one mole of hydrogen is consumed per mole of diene IV. This occurs rapidly although the rate depends to some extent on the amount of catalyst that is present. When the reaction is complete the reduced product may be conveniently recovered by removing the catalyst and reaction solvent, and purifying the material by techniques such as chromatography. The methods preferred for recovering the desired substances from the reaction mixture will depend, of course, on factors such as the degree of purification required, the amount of material involved and the like.

Although it might be expected that hydrogenolysis of the 7-R-4,6,2'-trimethoxy-6'-$R_1$-gris-2,5'-diene-3,4' - dione (IV) would occur instead of hydrogenation, we have found that the major reaction product is the 7-R-4,6,2'-trimethoxy-6'-$R_1$-gris-2-ene-3,4'-dione of Formula V above, and that only minor amounts of the hydrogenolytic product, i.e. the benzophenone derivative III, are obtained.

Utilizing the catalytic reduction process described above, there may be produced the racemic form of griseofulvin (Compound V, R=Cl, $R_1$=$CH_3$) and racemates of griseofulvin analogs such as 7-fluoro-4,6,2'-trimethoxy-6'-methyl-gris-2'-ene-3,4'-dione (V, R=F, $R_1$=$CH_3$), 7-chloro-4,6,2'-trimethoxy-6'-ethyl-gris-2'-ene-3,4'-dione (V, R=Cl, $R_1$=$C_2H_5$) and 4,6,2'-trimethoxy-gris-2'-ene-3,4'-dione (V, R=$R_1$=H).

According to a second aspect of this invention, we have discovered that 7-R-4,6,2'-trimethoxy-6'-$R_1$-gris-2',5'-diene-3,4'-dione (Compound IV) having Formula IV above, where R and $R_1$ are as previously defined, may be converted to 2,4'-dihydroxy-3-R-4,6,2'-trimethoxy-6'-$R_1$-benzophenone (Compound III) by treatment with a metallic reducing agent such as with a chromous salt, e.g. chromous chloride, chromous acetate and the like, or with a zinc-acid system such as zinc-acetic acid or zinc-hydrochloric acid. The process may be satisfactorily brought about by intimately contacting the diene IV and the reducing agent at room temperature, although elevated temperatures may be used if desired. It is substantially complete in from about 6 to about 20 hours. Since it is known that 7-R-4,6,2'-trimethoxy-6'-$R_1$-gris-2'-ene-3,4' dione (Compound V) may be dehydrogenated to 7-R-4,6,2'-trimethoxy-6'-$R_1$-gris-2',5'-diene-3,4'-dione (Compound IV) with selenium dioxide (this method has been used for preparing dehydrogriseofulvin from natural griseofulvin), our novel synthesis of the substituted benzophenone (III) from the diene (IV) permits the ready preparation of the benzophenone from natural griseofulvin. This is of moment because Compound III can be chemically modified without totally destroying the molecule more readily than Compounds IV and V. There is thus made available a new method for preparing griseofulvin analogs from natural griseofulvin. This method comprises the synthesis of Compound III (R=Cl, $R_1$=$CH_3$) from griseofulvin via the selenium dioxide and chromous chloride reactions described above, chemical modification of the benzophenone III as desired (e.g. removal of the chloro substituent), and re-synthesis of a griseofulvin analog by the previously discussed potassium ferricyanide and catalytic hydrogenation steps.

The following examples are given for the purposes of illustration and not by way of limitation:

EXAMPLE I

A. 2-Chloro-3,5-Dimethoxyphenyl-2-Methyl-4-Acetoxy-6-Methoxybenzoate

A solution of 800 mg. of 2-methyl-4-acetoxy-6-methoxybenzoic acid in 20 ml. of thionyl chloride is kept at 50° C. for 2 hours. The reaction mixture is concentrated to dryness under vacuum to give a residue of 2-methyl-4-acetoxy-6-methoxybenzoyl chloride. To this product is added 626 mg. of 2-chloro-3,5-dimethoxyphenol and 11 ml. of pyridine. The mixture is warmed on the steam bath for 2 minutes and then kept at 25° C. for 18 hours. Chloroform is then added and the mixture extracted with cold dilute hydrochloric acid, cold dilute sodium hydroxide solution and saturated sodium chloride solution. The chloroform solution is dried over magnesium sulfate, filtered and then concentrated to dryness under vacuum. Crystallization of the resulting residue from ether gives 880 mg. of 2-chloro-3,5-dimethoxyphenyl-2-methyl-4-acetoxy-6-methoxybenzoate, M.P. 152–155° C.

$\lambda_{max}^{MeOH}$ 281 m$\mu$ ($\epsilon$, 4150); $\lambda_{max}^{chf.}$ 5.75, 5.80$\mu$

B. 2-Chloro-3,5-Dimethoxyphenyl-2-Methyl-4-Hydroxy-6-Methoxybenzoate

A solution of 870 mg. of 2-chloro-3,5-dimethoxyphenyl-2-methyl-4-acetoxy-6-methoxybenzoate in 60 ml. of methanol and 40 ml. of aqueous 10% sodium hydroxide is kept at 25° C. for 4 hours. The methanol is then removed under vacuum and the reaction mixture is extracted with chloroform. The aqueous phase is acidified with dilute hydrochloric acid, extracted with chloroform and the chloroform extract washed with salt solution and dried over magnesium sulfate. It is filtered to remove the drying agent and concentrated to dryness under vacuum. The residue is crystallized to give 615 mg. of 2-chloro-3,5-dimethoxyphenyl-2-methyl-4-hydroxy-6 - methoxybenzoate, M.P. 142–144° C.;

$\lambda_{max.}^{MeOH}$ 283 m$\mu$ ($\epsilon$, 5700), 261 m$\mu$ ($\epsilon$, 6800), $\lambda_{max.}^{chf.}$ 2.76, 3.00, 5.74$\mu$

EXAMPLE 2

*2,4'-Dihydroxy-3-Chloro-4,6,2'-Trimethoxy-6'-Methylbenzophenone*

A solution of 100 mg. of 2-chloro-3,5-dimethoxyphenyl - 2 - methyl - 4 - hydroxy - 6 - methoxybenzoate in 2.5 ml. of ethanol in a quartz tube is irradiated with ultra-violet light (Hanovia Type 16A13 broad spectrum low pressure light source) at 40° C. for 66 hours. The solvent is removed and the residue chromatographed on a column of 20 g. of Florisil. The column is eluted successively with benzene, benzene-chloroform, chloroform and chloroform-methanol mixtures. Crystallization of the residues obtained from the chloroform: 5–10% methanol eluates from ethyl ether gives 2,4'-dihydroxy-3-chloro-4,6,2'-trimethoxy-6'-methylbenzophenone, M.P. 212.5–215° C.

EXAMPLE 3

*Dehydrogriseofulvin*

To a stirred solution of 2.25 g. of 2,4'-dihydroxy-4,6,2' - trimethoxy-6'-methyl-3-chloro-benzophenone and 27 g. of potassium carbonate in 250 ml. of boiled nitrogen-flushed distilled water is added a solution of 4.0 g. of potassium ferricyanide in 50 ml. of water. The addition is carried out in a nitrogen atmosphere over a period of 1 hour. The reaction mixture is stirred at room temperature under nitrogen for 18 hours. The precipitated material is recovered by filtration and air dried. It is dissolved in chloroform and the solution filtered. The chloroform is diluted with about an equal volume of ether and washed with ice-cold 2% potassium hydroxide solution and with water. The organic solvent solution is dried over magnesium sulfate, filtered and concentrated to dryness in vacuo. The residue is crystallized from acetone-ethyl acetate to afford substantially pure racemic dehydrogriseofulvin, M.P. 284–286° C.; $\lambda$ max. 292 m$\mu$ ($\epsilon$, 32,000), infl. 230 m$\mu$ ($\epsilon$, 22,000), infl. 318 ($\epsilon$, 5,900). Further purification by passage through a Florisil column raises the melting point to 291–293° C.

EXAMPLE 4

*Griseofulvin*

500 mg. of racemic dehydrogriseofulvin in 110 ml. of ethyl acetate is added to a stirred suspension of 1.0 g. of pre-reduced 10% palladium on charcoal catalyst and hydrogenated at atmospheric pressure and 22° C. When 1.0 mole of hydrogen is absorbed (occurs rapidly) the catalyst is removed by filtration and the filtrate concentrated in vacuo to a viscous pale yellow oil. This oil is dissolved in 50 ml. of methylene chloride and the solution washed with 3 x 10 ml. of ice-cold 2% potassium hydroxide, water, and dried over magnesium sulfate. The methylene chloride solution is filtered and concentrated to dryness in vacuo. The solid residue thus obtained is dissolved in 15 ml. of benzene and chromatographed on a column of 15 g. of Florisil. The column is eluted with 15-ml. portions of benzene, benzene-chloroform mixtures and finally with chloroform. From the chloroform eluates there is obtained two racemates, one with M.P. 213–215° C. (11.5% yield) and the second with M.P. 222–224° C. (51% yield). Characterization is by in vivo bio-assay by the disc-plate method with *Botrytis allii* as the test organism.

The material melting at 222–224° C. is racemic griseofulvin. It has 50% of the activity of natural griseofulvin.

EXAMPLE 5

*2-Chloro-3,5-Dimethoxyphenyl-4-Hydroxy-6-Methoxybenzoate*

A. 1 g. of 4-acetoxy-2-methoxybenzoic acid is added to 20 g. of thionyl chloride and the resulting mixture held at 50° C. for 130 minutes. The reaction mixture is then concentrated to dryness to give a residue of 4-acetoxy-2-methoxybenzoyl chloride. This material is mixed with 15 ml. of pyridine and 720 mg. of 2-chloro-3,5-dimethoxyphenol. The reaction mixture is heated at about 90° C. for 2 minutes and then held at room temperature for 12 hours. Chloroform is then added to the solution and 2-chloro-3,5-dimethoxyphenyl-4-acetoxy-6-methoxybenzoate recovered and crystallized by the procedure described in Example 1A.

The benzoate ester is treated with aqueous methanolic sodium hydroxide at room temperature by the process of Example 1B. There is thus obtained 2-chloro-3,5-dimethoxy - 4 - hydroxy - 6 - methoxybenzoate, M.P. 147–150° C.;

$\lambda_{max.}^{chf.}$ 3.05, 5.88$\mu$

B. The acid chloride of 2-methyl-4-acetoxy-6-methoxy-benzoic acid is prepared from the free acid as described in Examples 1A and 5A, and reacted with phloroglucinol dimethyl ether by the procedure of Example 1A to give 3,5-dimethoxyphenyl-2-methyl-4-acetoxy-6-methoxybenzoate. This ester is hydrolyzed to 3,5-dimethoxyphenyl - 2 - methyl-4-hydroxy-6-methoxybenzoate with methanolic sodium hydroxide according to the procedures of Examples 1B and 5A.

EXAMPLE 6

*2,4'-Dihydroxy-3-Chloro-4,6,2'-Trimethoxybenzophenone*

A. 200 mg. of 2-chloro-3,5-dimethoxy-4-hydroxy-6-methoxybenzoate in 5 ml. of ethanol in a quartz tube is irradiated with ultra-violet light (Hanovia Type 16A13 broad spectrum low pressure light source) at 40° C. for 58 hours. The resulting reaction mixture is treated by the recovery procedure of Example 2 above to give 2,4'-dihydroxy-3-chloro-4,6,2'-trimethoxybenzophenone.

B. When the above procedure is carried out using 3,5-dimethoxyphenyl - 2 - methyl-4-hydroxy-6-methoxybenzoate as starting material, there is obtained 2,4'-dihydroxy-4,6,2'-trimethoxy-6'-methylbenzophenone.

EXAMPLE 7

*7-Chloro-4,6,2'-Trimethoxy-Gris-2',5'-Diene-3,4'-Dione*

A. 2.2 g. of 2,4'-dihydroxy-3-chloro-4,6,2'-trimethoxybenzophenone is treated with 27 g. of potassium carbonate and 4 g. of potassium ferricyanide under nitrogen by the method of Example 3. There is obtained substantially pure racemic 7-chloro-4-6,2'-dimethoxy-gris-2'5'-diene-3,4'-dione.

B. When the procedure of Example 3 is carried out employing 2,4'-dihydroxy-4,6,2'-trimethoxy - 6' - methylbenzophenone as the starting material, there is obtained racemic 4,6,2' - trimethoxy - 6' - methyl - gris - 2,5' - diene - 3,4'-dione.

EXAMPLE 8

*7-Chloro-4,6,2'-Trimethoxy-Gris-2'-Ene-3,4'-Dione*

A. When the product of Example 7A is treated with hydrogen in the presence of palladium on charcoal catalyst according to the procedure of Example 4, there is obtained from the chloroform eluates racemic 7-chloro-4,6,2'-trimethoxy-gris-2'-ene-3,4'-dione.

B. When racemic 4,6,2'-trimethoxy-6'-methyl-gris-2',5'-diene-3,4'-dione is hydrogenated according to the procedure of Example 4, there is obtained racemic 4,6,2'-trimethoxy-6'-methyl-gris-2'-ene-3,4'-dione.

EXAMPLE 9

7-Fluoro-4,6,2'-Trimethoxy-6'-Methyl-Gris-2'-Ene-3,4'-Dione

A. 50 g. of the benzyl ether of 2-amino-3,5-dimethoxyphenol is added to 100 ml. of methanol and 3 g. of 5% palladium on charcoal. The solution is treated with hydrogen until about 1 mole of hydrogen is consumed. It is then filtered and concentrated to dryness in vacuo to give a residue of 2-amino-3,5-dimethoxyphenol.

20 g. of this phenol in 40 ml. of hydrochloric acid is mixed with 15 g. of sodium nitrite in 25 ml. of water. To the resulting solution is added 60 ml. of 40% fluoboric acid. A diazonium fluoborate salt precipitates and is recovered by filtration. It is washed with fluoboric acid and then successively with ethyl alcohol and ether. It is then dried in vacuo. On warming, the product decomposes to give 2-fluoro-3,5-dimethoxyphenol which may be purified by distillation in vacuo.

B. 2-fluoro - 3,5 - dimethoxyphenyl - 2 - methyl - 4 - acetoxy-6-methoxybenzoate is obtained by reacting together the acid chloride of 2-methyl-4-acetoxy-6-methoxybenzoic acid and 2-fluoro-3,5-dimethoxyphenol according to the procedure of Example 1A. This latter compound is hydrolyzed to 2-fluoro-3,5-dimethoxyphenyl-2-methyl-4-hydroxy-6-methoxybenzoate according to the method of Example 1B.

When 2 - fluoro - 3,5 - dimethoxyphenyl-2-methyl-4-hydroxy-6-methoxybenzoate is irradiated with ultra-violet light according to the process described in Example 2, there is obtained 2,4' - dihydroxy - 3 - fluoro - 4,6,2' - trimethoxy-6'-methylbenzophenone. This latter material is converted with aqueous potassium carbonate and potassium ferricyanide to racemic 7-fluoro-4,6,2'-trimethoxy-6'-methyl-gris-2',5'-diene-3,4'-dione under the conditions set forth in Example 3 above.

Racemic 7 - fluoro - 4,6,2' - trimethoxy - 6' - methyl-gris-2'-ene-3,4'-dione is obtained by hydrogenating a solution of the diene in the presence of palladium catalyst by the method of Example 4.

EXAMPLE 10

2,4'-Dihydroxy-4,6,2'-Trimethoxy-6'-Methyl-3-Chloro-Benzophenone

A. 1.0 g. of dehydrogriseofulvin in 100 ml. of acetic acid is treated with stirring at room temperature with 4.0 g. of zinc dust. The reaction mixture is allowed to stir at room temperature for 16 hours. The zinc is then removed by filtration and the filtrate concentrated to dryness in vacuo. The residue is dissolved in methylene chloride and extracted four times with ice-cold 2% aqueous potassium hydroxide. The yellow alkaline extracts are acidified with dilute sulfuric acid and the precipitated solid recovered by filtration. It is extracted with chloroform, and the chloroform extracts washed with water and dried over magnesium sulfate. The chloroform solution is filtered and concentrated to dryness in vacuo. The residue is crystallized from acetone-benzene to give 720 mg. of 2,4'-dihydroxy-4,6,2'-trimethoxy-6'-methyl-3-chloro-benzophenone, M.P. 210–212° C.; λ max. 297 mμ (ε, 18,500) and 332 mμ (ε, 6,200).

B. To a solution of 100 mg. of dehydrogriseofulvin in 15 ml. of acetic acid layered with petroleum ether is added 4 ml. of an aqueous solution of chromous chloride (4.0 mmole) and the reaction mixture is stirred at room temperature for 16 hours. The green reaction mixture is then diluted with a large volume of chloroform and washed with cold aqueous 2% sodium bicarbonate, cold dilute hydrochloric acid, water and dried over magnesium sulfate. Concentration of the chloroform solution in vacuo affords, after crystallization from acetone-benzene, 41 mg. of 2,4'-dihydroxy-4,6,2'-trimethoxy-6'-methyl-3-chloro-benzophenone, M.P. 210–212° C.

C. Substitution of chromous acetate for chromous chloride in the procedure of Part B gives the same result.

EXAMPLE 11

Dehydrogriseofulvin

A suspension of 5.0 g. of griseofulvin and 5.0 g. of freshly sublimed selenium dioxide in 250 ml. of t-butanol is refluxed in a nitrogen atmosphere for 65 hours. After filtration through diatomaceous earth, the reaction mixture is concentrated in vacuo to an orange solid. The latter is dissolved in benzene and washed three times with water, dried over magnesium sulfate, concentrated in vacuo to a small volume and then chromatographed on 200 g. of Florisil. From the chloroform eluates there is obtained 2.09 g. of dehydrogriseofulvin, M.P. 257–258° C., after crystallization from benzene. The melt crystallizes and remelts at 267–269° C.

Any departure from the above description which conforms to the present invention is intended to be included within the scope of the claims.

What is claimed is:

1. The process for preparing a compound having the structural formula

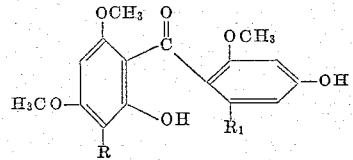

where R is selected from the class consisting of hydrogen and halogen, and $R_1$ is selected from the class consisting of hydrogen and lower alkyl groups, that comprises intimately contacting a compound of the formula

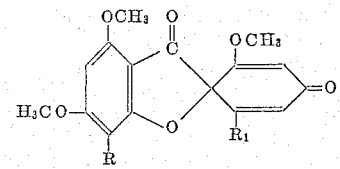

where R and $R_1$ have the meaning defined above, with a reducing agent selected from the class consisting of chromous chloride, chromous acetate, zinc-acetic acid and zinc-hydrochloric acid.

2. The process for preparing 2,4'-dihydroxy-4,6,2'-trimethoxy-6'-methyl-3-chloro-benzophenone that comprises intimately contacting 7 - chloro - 4,6,2'-trimethoxy-6'-methyl-gris-2',5'-diene-3,4'-dione with zinc in the presence of acetic acid.

References Cited in the file of this patent

UNITED STATES PATENTS

| | | |
|---|---|---|
| 2,861,104 | Von Glahn et al. | Nov. 18, 1958 |
| 2,861,105 | Stanley et al. | Nov. 18, 1958 |
| 2,879,275 | Feichtinger et al. | Mar. 24, 1959 |
| 2,881,187 | Feichtinger et al. | Apr. 7, 1959 |